United States Patent
Park

(10) Patent No.: US 7,046,961 B2
(45) Date of Patent: May 16, 2006

(54) LINK CONNECTION METHOD BETWEEN COMMUNICATION TERMINALS EQUIPPED WITH BLUETOOTH WIRELESS DEVICES

(75) Inventor: Seok-Hyo Park, Kumi-shi (KR)

(73) Assignee: Samsung Electronics Co., Ltd., (KR)

( * ) Notice: Subject to any disclaimer, the term of this patent is extended or adjusted under 35 U.S.C. 154(b) by 708 days.

(21) Appl. No.: 09/927,593

(22) Filed: Aug. 10, 2001

(65) Prior Publication Data

US 2002/0111138 A1    Aug. 15, 2002

(30) Foreign Application Priority Data

Feb. 9, 2001 (KR) ................................. 2001/6453

(51) Int. Cl.
*H04B 3/16* (2006.01)
(52) U.S. Cl. .................. 455/41.2; 455/414.1; 455/436; 455/510; 455/566; 370/493
(58) Field of Classification Search ............ 455/414.1, 455/41.1–41.3, 436, 509, 510, 513, 515–517, 455/500, 431.1, 464, 552.1, 557; 370/216, 370/315, 342, 252, 493, 235; 379/88.01; 725/105; 709/203; 704/246
See application file for complete search history.

(56) References Cited

U.S. PATENT DOCUMENTS

| | | | |
|---|---|---|---|
| 5,390,341 A * | 2/1995 | Ziniel | 455/517 |
| 6,014,087 A * | 1/2000 | Krishnakumar et al. | 340/825.5 |
| 6,263,212 B1 * | 7/2001 | Ross et al. | 455/466 |
| 6,434,113 B1 * | 8/2002 | Gubbi | 370/216 |
| 6,480,472 B1 * | 11/2002 | Jou et al. | 370/252 |
| 6,597,672 B1 * | 7/2003 | Gustafsson et al. | 370/329 |
| 6,721,564 B1 * | 4/2004 | Kobayashi | 455/436 |
| 6,754,486 B1 * | 6/2004 | Cox et al. | 455/414.1 |
| 6,804,532 B1 * | 10/2004 | Moon et al. | 455/552.1 |
| 2002/0026474 A1 * | 2/2002 | Wang et al. | 709/203 |
| 2002/0065071 A1 * | 5/2002 | Hunzinger | 455/421 |
| 2003/0036350 A1 * | 2/2003 | Jonsson et al. | 455/41 |
| 2003/0223461 A1 * | 12/2003 | Sharma et al. | 370/493 |
| 2004/0009749 A1 * | 1/2004 | Arazi et al. | 455/41.2 |
| 2005/0060154 A1 * | 3/2005 | Kumar | 704/246 |

FOREIGN PATENT DOCUMENTS

| | | |
|---|---|---|
| JP | 2002-027019 | 1/2002 |
| JP | 2002-101104 | 4/2002 |
| JP | 2002-279019 | 9/2002 |

\* cited by examiner

*Primary Examiner*—Fan Tsang
*Assistant Examiner*—Md S. Elahee
(74) *Attorney, Agent, or Firm*—Dilworth & Barrese LLP

(57) ABSTRACT

There is provided a link connection method between communication terminals equipped with Bluetooth wireless devices. To automatically connect a link with a communication terminal equipped with a Bluetooth wireless device acting as a slave by Bluetooth wireless communication, a communication terminal equipped with a Bluetooth wireless device acting as a master transmits a link connection request message to the slave upon request of a link connection with the slave. Then, the master determines whether the link is connected and if the link is not connected, transmits the link connection request message as many times as a predetermined number of automatic link connection attempts until the link is connected.

7 Claims, 3 Drawing Sheets

LINK CONNECTION METHOD BETWEEN COMMUNICATION TERMINALS EQUIPPED WITH BLUETOOTH WIRELESS DEVICES

PRIORITY

This application claims priority to an application entitled "Link Connection Method Between Communication Terminals Equipped With Bluetooth Wireless Devices" filed in the Korean Industrial Property Office on Feb. 9, 2001 and assigned Serial No. 2001-6453, the contents of which are hereby incorporated by reference.

BACKGROUND OF THE INVENTION

1. Field of the Invention

The present invention relates generally to a communication terminal equipped with a Bluetooth wireless device, and in particular, to a link connection method between communication terminals equipped with Bluetooth wireless devices.

2. Description of the Related Art

The development of wireless communication technology enables realization of low-cost, low-power wireless devices or wireless links. The wireless communication technology offsets a base that cuts the cords used to tie up communication devices and office devices that are becoming smaller and more portable. In this context, Ericsson of Sweden proposed Bluetooth. Bluetooth is intended to offer fast and reliable short-range radio communication and service convenience to business users. Bluetooth defines the optimized technical characteristics of portable computers and communication device models. Bluetooth devices are designed especially to provide low-cost, robust, efficient, high-rate transmission of both voice and data.

Devices equipped with Bluetooth wireless modules can transmit voice and data in real time on a radio link between portable phones, laptops, and desktops within a 10 meter range of each other. Bluetooth units sharing the same channel form a piconet with one unit acting as a master and the other units acting as slaves. The master transmits voice and/or data and the slaves receive voice and/or data. The roles of the master and the slaves can be changed according to the subject of transmission. Because a Bluetooth wireless device can be fabricated in the form of a fine microchip, it can be easily mounted to a communication device and operate in a globally compatible 2.4 GHz band.

A radio link is connected between Bluetooth-compatible communication terminals, more specifically, a communication terminal main body and an auxiliary communication terminal. Between a mobile terminal and a wireless headset, for example, a radio link is connected for transmission of voice or data upon call origination/termination. The main body requesting link connection, the master is the mobile terminal and the slave is the wireless headset.

Meanwhile, if the auxiliary communication terminal is beyond a link connectable range or a radio communication condition is bad when the communication terminal as a master requests link connection, the link connection fails. In this case, a user must reattempt a link connection.

SUMMARY OF THE INVENTION

It is, therefore, an object of the present invention to provide a method of automatically reattempting a link connection if the link connection has failed because an auxiliary communication terminal, as a slave, is beyond a link connectable range or a radio communication condition is bad upon request of link connection from a communication terminal as a master.

The foregoing and other objects of the present invention are achieved by providing a link connection method between communication terminals equipped with Bluetooth wireless devices. To automatically connect a link with a communication terminal equipped with a Bluetooth wireless device acting as a slave by Bluetooth wireless communication, a communication terminal equipped with a Bluetooth wireless device acting as a master transmits a link connection request message to the slave upon request of a link connection with the slave. Then, the master determines whether the link is connected and if the link is not connected, transmits the link connection request message as many times as a predetermined number of automatic link connection attempts until the link is connected.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Figure 1:
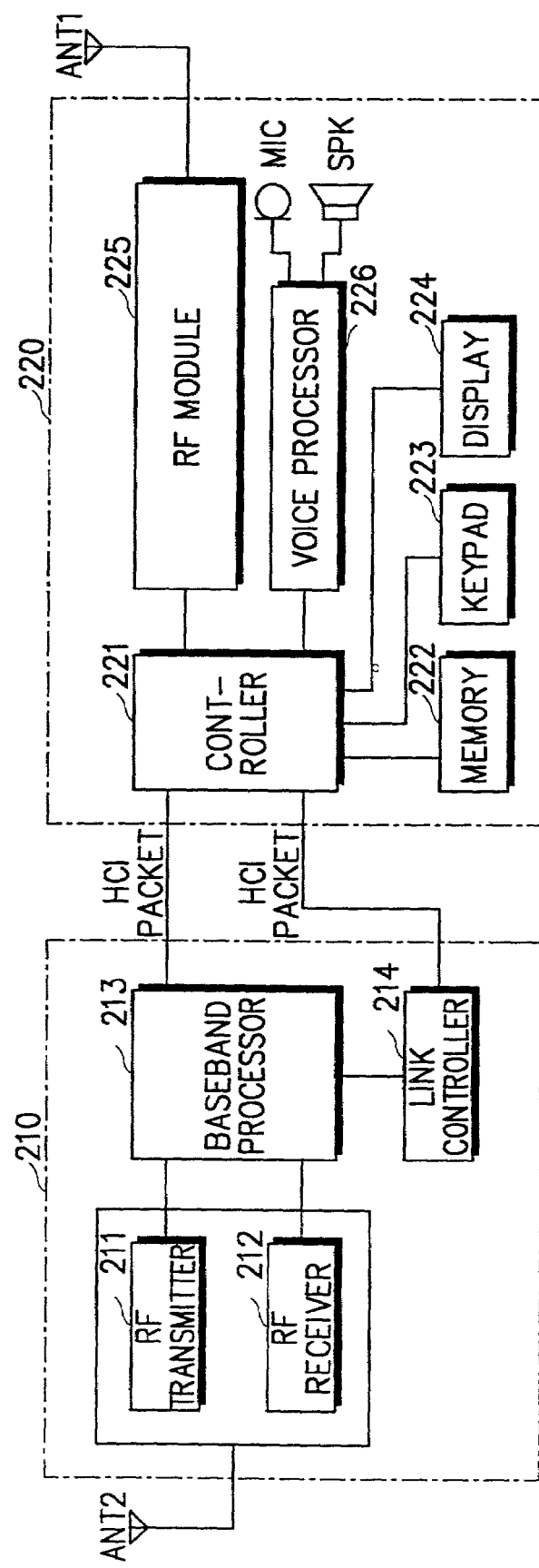
FIG. 1 is a block diagram of a main body of a mobile terminal equipped with a Bluetooth wireless device according to an embodiment of the present invention.

A mobile terminal to which the present invention is applied will be described with reference to FIG. 1. FIG. 1 is a block diagram of a mobile terminal equipped with a Bluetooth wireless device according to an embodiment of the present invention.

Referring to FIG. 1, the mobile terminal is largely dived into a Bluetooth module 210 and a mobile terminal portion 220. A baseband processor 213 and a link controller 214 in the Bluetooth module 210 are connected to a controller 221 via an HCI (Host Control Interface), for exchanging control commands and user data in HCI packets. The HCI packets include commands, events, and data packets. An RF transmitter 211 in the Bluetooth module 210 performs modulation and amplification on a radio transmission data packet received from the baseband processor 213 in a predetermined frequency band prior to transmission. An RF receiver 212 amplifies a predetermined frequency band signal from a received signal, suppressing as much noise of the frequency signal as possible and downconverts the amplified signal. The baseband processor 213 adds an access code and a header to an HCI data packet received from the controller 221 of the mobile terminal portion 220 as a host, converts the resulting packet to a predetermined data packet for wireless transmission, and wirelessly transmits the data packet in a predetermined frequency band through the RF transmitter 211. The baseband processor 213 also converts a data packet received from the RF receiver 212 to an HCI packet and feeds the HCI packet to the controller 221. The link controller 214 controls the Bluetooth module 210 according to a command of a command packet received from the controller 221 and transmits requests and result information of a radio headset received from the baseband processor 213 to the controller 221 in HCI packets.

In FIG. 1, the controller 221 provides overall control to the mobile terminal portion 220 and controls radio link connection according to the number of predetermined automatic connection attempts. A memory 222 includes a program memory for storing control data required for control of the mobile terminal and program data and a data memory for storing data generated during a control operation or user-originated data. The program memory has an automatic link connection menu and related program data according to the present invention. A keypad 223 has a plurality of digit keys and function keys and outputs key input data corresponding to a key pressed by the user to the controller 221. A display 224 displays states and operations associated with data communication and voice calls using the radio headset under the control of the controller 221. An RF module 225 controls transmission/reception of voice data and control data under the control of the controller 221. A voice processor 226 converts voice data received from the RF module 225 to an audible sound and outputs the audible sound through a speaker under the control of the controller 221. The voice processor 226 also converts a voice signal received from a microphone to voice data and feeds the voice data to the RF module 225 under the control of the controller 221. While the Bluetooth module 210 and the mobile terminal portion 220 are provided with the separate antennas ANT2 and ANT1 in FIG. 1, use of a separator (not shown) separating a portable phone band from a Bluetooth band enables integration of the two antennas into a single one. An LED (Light Emitting diode) (not shown) displays the call connection state of the mobile terminal under the control of the controller 221.

Figure 2:
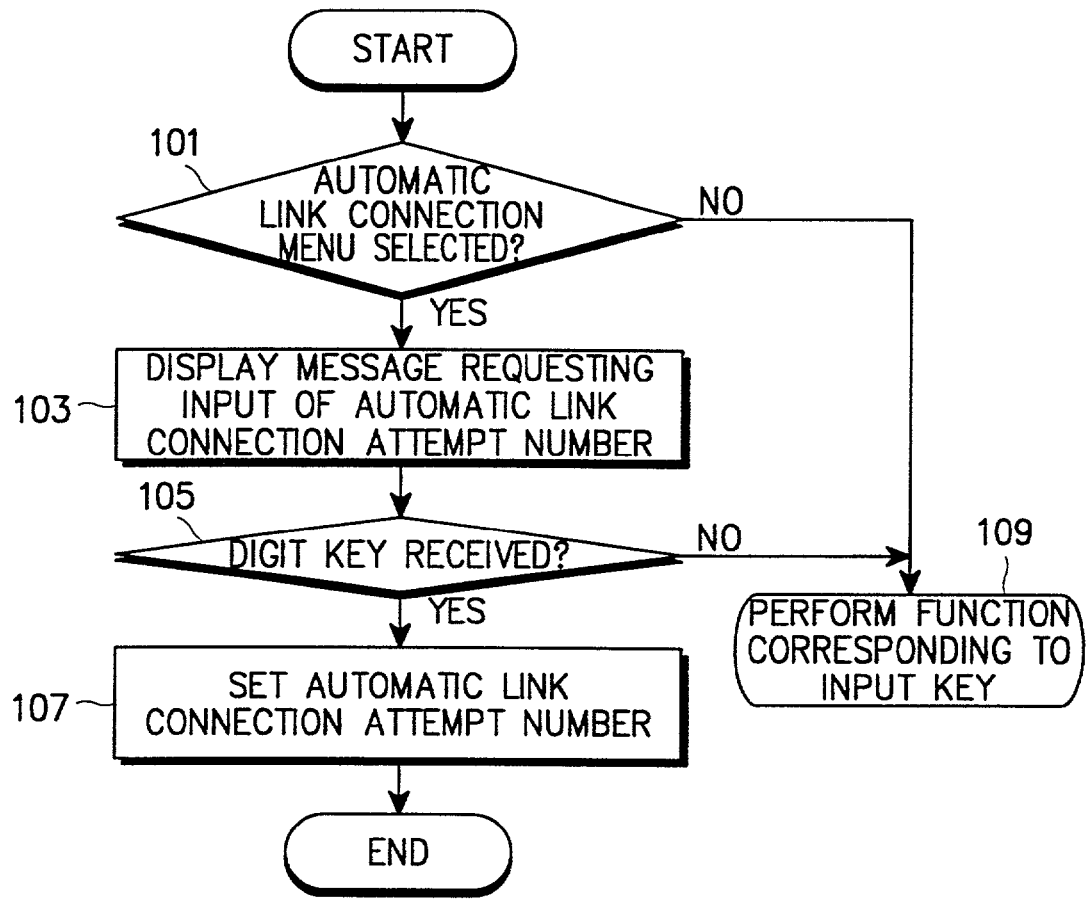
FIG. 2 is a flowchart illustrating a control operation of determining the number of automatic link connection attempts for the mobile terminal according to the embodiment of the present invention.

An automatic link connection menu is selected by input of a menu key and a digit key, and the number of automatic link connection attempts is set by entering an intended attempt number according to the present invention. This operation will be described referring to FIG. 2. FIG. 2 is a flowchart illustrating an operation of setting the number of automatic link connection attempts in a mobile terminal according to an embodiment of the present invention.

Referring to FIG. 2, the controller 221 of the mobile terminal determines whether an automatic link connection menu has been selected in step 101. Upon selection of the automatic link connection menu, the controller 221 goes to step 103 and otherwise, it goes to step 109. In step 103, the controller 221 displays a message requesting input of the number of automatic link connection attempts on the display 224. Upon input of a digit key in step 105, the controller 221 proceeds to step 107 and upon input of a key other than a digit key in step 105, it goes to step 109. In step 107, the controller 221 sets the number of automatic link connection attempts corresponding to the input digit key and ends the procedure. For example, if a digit key 7 is received, the controller 221 sets the number of automatic link connection attempts to 7 and an automatic link connection mode. In step 109, the controller 221 performs a function corresponding to the key input.

The number of automatic link connection attempts can be set in another communication terminal by Bluetooth wireless communication. The mobile terminal with the automatic link connection attempt number set acts as a master and transmits a message indicating the automatic link connection attempt number to a communication terminal acting as a slave. Then, when an initial link connection attempt from the slave to the master fails, the slave automatically reattempts link connection as many times as the set automatic link connection attempt number. The automatic link connection attempt number set by Bluetooth wireless communication is used as the number of link reconnection attempts for a mobile terminal only when it acts as a slave. If it acts as a master, it reattempts link connection as many times as the number of automatic link connection attempts set according to the procedure shown in FIG. 2. That is, the number of automatic link connection attempts is set and managed separately according to whether a mobile terminal acts as a master or a slave.

Figure 3:
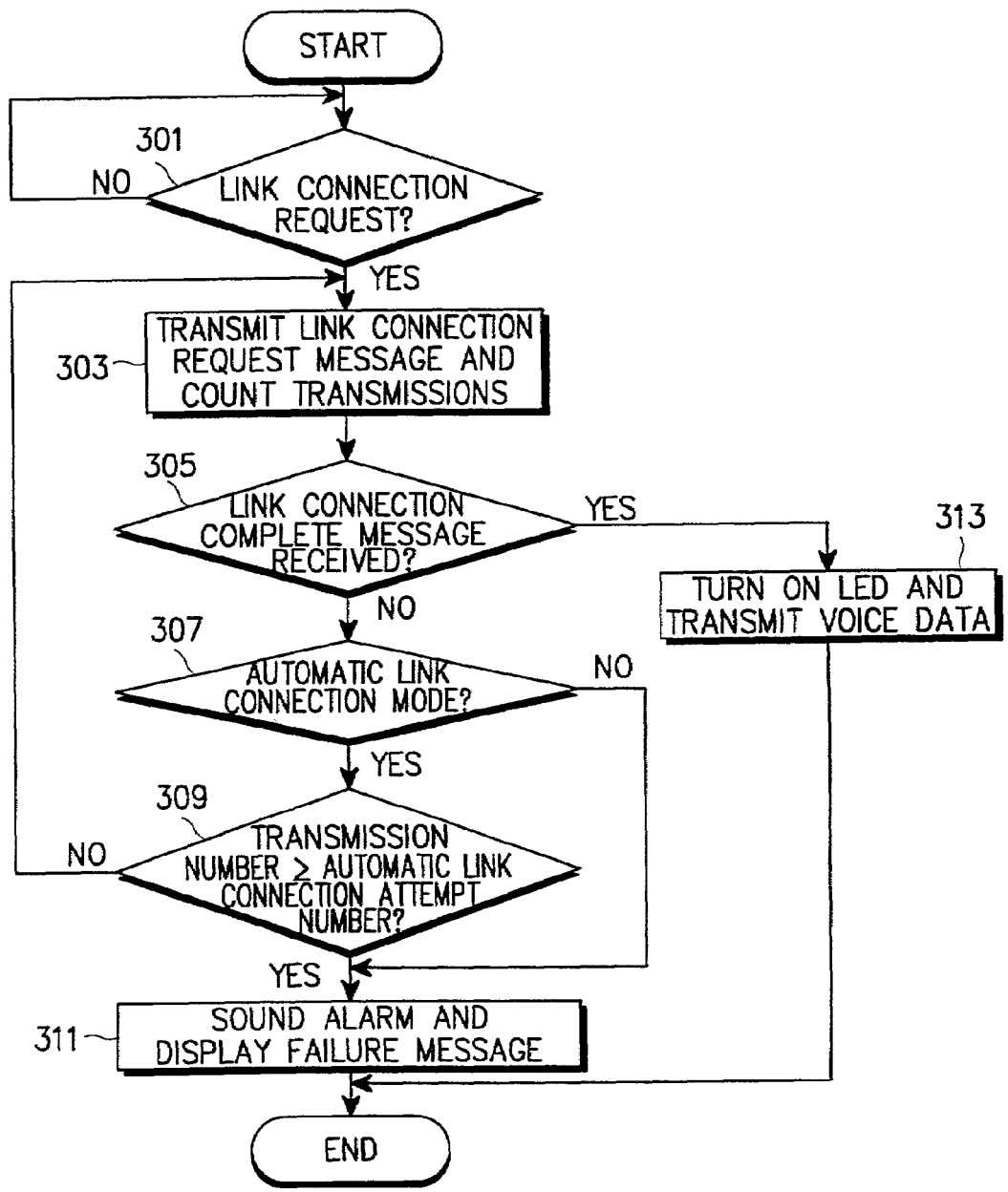
FIG. 3 is a flowchart illustrating a control operation of link connection according to the embodiment of the present invention.

Connection of a radio link between the communication terminal as a master with the automatic link connection mode set according to the above-described procedure and a communication terminal as a slave will be described below referring to FIG. 3. In the embodiment of the present invention, the master is the mobile terminal and the slave is the wireless headset, by way of example. FIG. 3 is a flowchart illustrating a control operation for link connection according to the embodiment of the present invention.

Referring to FIG. 3, the controller 221 of the mobile terminal determines whether a link connection request has been generate in step 301. For example, if a call is terminated, the call termination itself is a link connection request and a link connection is attempted to connect the incoming call in steps 303 to 313. Therefore, the controller 221 determines whether a link connection request has been generated by call origination/termination or other operations of the mobile terminal. Upon link connection request, the controller 221 transmits a link connection request data packet to the slave, that is, the wireless headset and counts the number of packet transmissions in step 303. In step 305, the controller 221 determines whether a link connection complete data packet has been received. Upon receipt of the link connection complete data packet, the controller 221 goes to step 313 and if the controller 221 fails to receive the link connection complete data packet, it goes to step 307. In step 313, the controller 221 turns on the LED to notify the success of link connection and transmits voice data on a connected link to the slave.

Meanwhile, the controller 221 determines whether the mobile terminal is set to an automatic link connection mode in step 307. If it is, the controller 221 goes to step 309 and otherwise, it goes to step 311. In step 309, the controller 221 compares the number of link connection request message transmissions with the set number of automatic link connection attempts. If the transmission number is equal to or greater than the automatic link connection attempt number, the controller 221 goes to step 311 and if the transmission number is less than the automatic link connection attempt number, the controller 221 goes to step 303. That is, if the set automatic link connection attempt number is 5, a link connection attempted by transmitting the link connection request message occurs up to five times. In step 311, the controller 221 recognizes the failure of link connection, displays a message indicating the link connection failure, and ends the link connection procedure.

In accordance with the present invention as described above, a radio link connection is automatically attempted between communication terminals equipped with Bluetooth wireless devices by setting the number of an automatic link connection attempts, which obviates the need for reconnection attempts by a user when a link connection is failed due to bad wireless communication conditions.

While the invention has been shown and described with reference to a certain preferred embodiment thereof, it is a mere exemplary application. For example, if a communication terminal acting as a master sets the number of automatic link connection attempts for a communication terminal acting as a slave by Bluetooth wireless communication, the master can transmit a message indicating the automatic link connection attempt number to the slave when the slave initially registers its ID in the master. In addition, every time the number of automatic link connection attempts set in the master is changed, the master transmits a message indicating an automatic link connection attempt number to the slave to update the existing automatic link connection attempt number. In this case, the master transmits the automatic link connection attempt number message periodically to the slave until it receives a response message from the slave. Thus, obviously it will be understood by those skilled in the art that various changes in form and details may be made therein without departing from the spirit and scope of the invention as defined by the appended claims.

What is claimed is:

1. A method of automatically connecting a link with a communication terminal equipped with a Bluetooth wireless device acting as a slave by Bluetooth wireless communication in a communication terminal equipped with a Bluetooth wireless device acting as a master, comprising the steps of:
   transmitting a link connection request message to the slave upon request of a link connection with the slave;
   determining whether the link is connected and transmitting the link connection request message as many times as a predetermined number of automatic link connection attempts until the link is connected if the link is not connected; and
   displaying a message requesting input of the automatic link connection attempt number upon receipt of key input selecting an automatic link connection menu, setting the automatic link connection attempt number corresponding to a received digit key, and setting an automatic link connection mode.

2. The method of claim 1, further comprising the step of sounding an alarm indicating a link connection failure and displaying a link connection failure message if the link is not connected after the link connection request message is transmitted more times than the automatic link connection attempt number.

3. A method of automatically connecting a link between a communication terminal equipped with a Bluetooth wireless device acting as a master and a communication terminal equipped with a Bluetooth wireless device acting as a slave, comprising the steps of:
   (a) transmitting a message indicating a predetermined automatic link connection attempt number to the slave by the master;
   (b) receiving the message indicating the automatic link connection attempt number from the master and setting the automatic link connection attempt number in the slave by the slave; and
   (c) attempting a link connection to the master by the slave and, if the link connection fails, attempting the link connection as many times as the automatic link connection attempt number by the slave.

4. The method of claim 3, wherein the master transmits the message indicating the number of automatic link connection attempts every time the master connects a link with the slave in the step (a).

5. A method of automatically connecting a link between a communication terminal equipped with a Bluetooth wireless device acting as a master and a communication terminal equipped with a Bluetooth wireless device acting as a slave, comprising the steps of:
   transmitting a message indicating a predetermined automatic link connection attempt number to the slave repeatedly by the master until the master receives a response message from the slave, upon initial registration of the ID of the slave in the master;
   transmitting the response message to the master by the slave upon receipt of the message indicating the automatic link connection attempt number and setting the automatic link connection attempt number in the slave by the slave; and
   attempting a link connection to the master by the slave and, if the link connection fails, attempting the link connection as many times as the automatic link connection attempt number by the slave.

6. The method of claim 5, further comprising the step of transmitting a message indicating a changed automatic link connection attempt number to the slave by the master until the master receives a response message for the message indicating the change from the slave, if the automatic link connection attempt number is changed.

7. The method of claim 5, wherein the communication terminal acting as a slave applies the automatic link connection attempt number set by the master as long as the communication terminal acts as the slave.

* * * * *